March 1, 1960     W. J. GRUBBS, JR     2,927,283
NONRECIPROCAL TRANSMISSION ASSEMBLY
Filed April 25, 1958     2 Sheets-Sheet 1
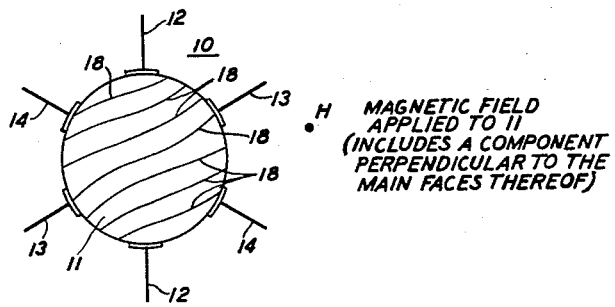
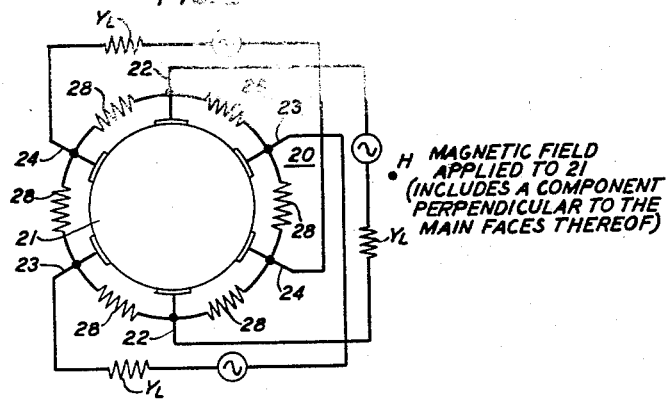
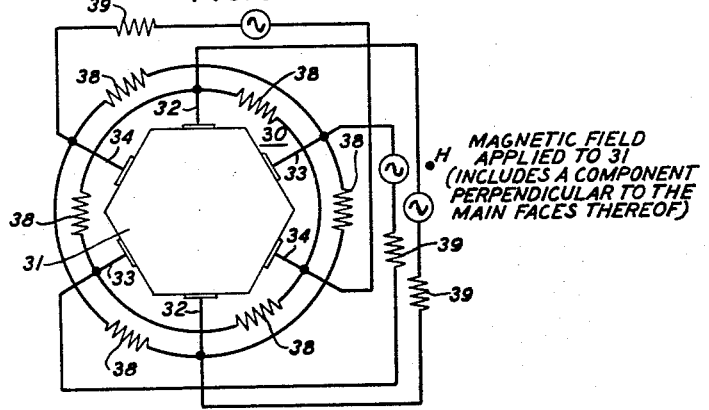
INVENTOR
W. J. GRUBBS, JR.
BY
ATTORNEY March 1, 1960 W. J. GRUBBS, JR 2,927,283
NONRECIPROCAL TRANSMISSION ASSEMBLY
Filed April 25, 1958

INVENTOR
W. J. GRUBBS, JR.
BY
ATTORNEY

United States Patent Office 2,927,283
Patented Mar. 1, 1960

2,927,283

NONRECIPROCAL TRANSMISSION ASSEMBLY

William J. Grubbs, Jr., Stirling, N.J., assignor to Bell Telephone Laboratories, Incorporated, New York, N.Y., a corporation of New York Application April 25, 1958, Serial No. 730,869

10 Claims. (Cl. 333—7)

This invention relates to nonreciprocal transmission assemblies, and more particularly to such assemblies comprising Hall-effect circulator elements.

Hall-effect circulator elements are fully and clearly described in Patent 2,774,890, issued to C. L. Semmelman on December 18, 1956. In Fig. 6 of that patent, there is shown a hexagonal Hall-effect circulator element having an electrical terminal centrally located on each of the six side edges thereof. The placing of such an element in a magnetic field of proper intensity and polarization, as furnished, for example, by an arrangement of the type shown in Fig. 7 of that patent, provides a device in which a signal applied to a first pair of opposed terminals is transferred or circulated only to a second pair of opposed terminals, while a signal applied to the second pair does not appear at the first pair but is instead circulated to the third pair. And, in a similar fashion, a signal applied to the third pair appears only at the first pair of terminals.

Thus, the element therein described is a signal circulating device exhibiting a nonreciprocal transmission characteristic.

Actually, the nonreciprocal characteristics of illustrative circulator elements are such that circulated or transmitted signals typically experience a loss of about 17.5 decibels, while "nontransmitted" signals typically suffer a loss of about 60 decibels. These loss figures are for a perfectly symmetrical circulator element, i.e., one in which the electrical connections thereto are equally spaced apart. The difference between the forward and reverse losses becomes undesirably smaller as the connections to the element deviate from symmetry.

An object of the present invention is an improved nonreciprocal transmission assembly.

More specifically, an object of this invention is an assembly including a circulator element, in which assembly the desired nonreciprocal circulating action may be attained with smaller or greater magnetic fields than those required for proper circulating action of the circulator element alone.

Another object of the present invention is an assembly including an asymmetrical circulator assembly, in which assembly the signal circulating characteristics of a symmetrical circulator element may be realized.

A further object of this invention is an assembly including a circulator element in combination with an asymmetrical configuration of load impedances, in which assembly symmetrical signal circulating action may be realized.

A still further object of the present invention is an assembly including a circulator element, which assembly is characterized by a lower forward loss than that exhibited by the circulator element per se.

These and other objects of the present invention are attained in a specific illustrative embodiment thereof, wherein a disc of semiconductive material including six edge terminals is arranged in parallel circuit relation with an appropriate resistance network.

Thus, a feature of this invention is a disc of semiconductive material having six terminal members electrically connected thereto and an appropriate resistance network connected in parallel with the terminal members.

Circulator assemblies made in accordance with the principles of the present invention are long-lived nonreciprocal broadband transmission assemblies.

A complete understanding of the invention and of the above and other features thereof may be gained from a consideration of the following detailed description and the accompanying drawing, in which:

Fig. 1 is a representation of a typical Hall-effect circulator element;

Fig. 2 is a schematic representation of a circulator element in combination with a resistance network, the combination forming one specific illustrative embodiment of the present invention;

Figs. 3, 4, 5 and 6 are, respectively, schematic representations of other illustrative embodiments of this invention, each embodiment including a circulator element in combination with a respectively different resistance network.

Figure 4:
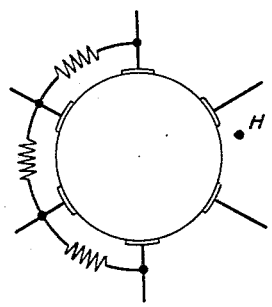

In Fig. 1 there is shown a circulator element 10 comprising a disc of semiconductive material 11 in a magnetic field, and to which element six electrical connections extend. The application of a direct current voltage to the element 10 by means of the connections 12 produces in the element 10 an equipotential field distribution which for one polarization and magnitude of the magnetic field is depicted approximately by the lines 18 of Fig. 1. Any point of the element 10 which falls on a given one of the lines 18 is with respect to any other point on that line at the same potential therewith.

The application of an alternating signal voltage to the connections or terminals 12 influences the electric field distribution in the element 10 in the manner shown, it being understood that, as the magnitude of the applied signal voltage varies, the pattern of the field distribution remains as shown but the potentials between respectively adjacent lines thereof vary in a manner correspondingly to the variation of the signal. It is noted that the terminals 13 rest on the same equipotential line. Thus, the signal applied to terminals 12 does not appears across the terminals 13, but some portion of the signal voltage does appear between the terminals 14, for the terminals 14 do not rest on the same equipotential line, but instead rest on lines whose potentials will vary correspondingly with the alternating signal voltage.

Similarly, it may be shown that a signal applied to the terminals 13 of the element 10 of Fig. 1 is transferred or circulated to the terminals 12, and that a signal applied to terminals 14 is circulated to the terminals 13.

It is thus seen that the element 10 is nonreciprocal in that signals can be circulated in a counterclockwise fashion from terminals 12 to 14 to 13 to 12 but not from terminals 12 to 13 to 14 to 12. It is noted, however, that, in accordance with the teachings of the above-identified Semmelman patent, clockwise signal circulation may be obtained by simply reversing the polarity of the magnetic field applied to the element 11.

In practice, load resistors matched to the pure resistance represented by the circulator element are respectively connected to the terminal pairs of the element.

The concept of decreasing the forward loss of a circulator while maintaining its relatively high reverse loss, thereby enhancing the nonreciprocal characteristics thereof, is an attractive one, and circulator assemblies made in accordance with one aspect of the principles of the present invention embody this concept. One such embodiment is shown in Fig. 2.

The assembly 20 shown in Fig. 2 includes a disc of semiconductive material 21 which may illustratively be a circular wafer of n-type germanium to which six connections equally spaced apart are electrically secured.

It is feasible to employ other semiconductive materials, for example, indium antimonide or indium arsenide, in the fabrication of circulator elements and assemblies. These other materials which exhibit higher Hall mobilities of electrons and thus lower forward losses, for example, about 10 decibels, are however, typically characterized by lower intrinsic resistivities than that exhibited by n-type germanium and might, therefore, not find wide utilization in a transmission system requiring relatively high impedance level components. There is, however, at least one other material which combines the properties of a relatively high Hall mobility and a relatively high intrinsic resistivity, and which, therefore, is well suited for inclusion in illustrative embodiments of the present invention; this material is gallium arsenide.

The assembly 20 includes six equivalued resistors 28 which are respectively connected between adjacent ones of the six connections, and further includes a magnetic field producing member for providing a component of magnetic flux perpendicular to the flat faces of the disc 21, which member is adjusted in the assembly 20 to provide a greater perpendicular magnetic field than would be required for signal circulating action in the circulator element included in the assembly of Fig. 2.

Before proceeding further with the description of the assembly 20, there will be defined a number of terms whose definitions are necessary for a complete understanding of the specific manner in which one would design such an assembly.

In a symmetrical circulator element, for example, the disc 21 of Fig. 2, including the three equally spaced apart terminal pairs 22, 23 and 24, the self admittances thereof are defined as the ratios of the currents to voltages of the respective terminal pairs, with the pairs (other than the one under test) short-circuited, and the admittances so defined are equal, i.e., $$Y_{22-22} = Y_{23-23} = Y_{24-24} = Y_S$$

The forward or transfer admittances of a symmetrical circulator element are as follows:

$$Y_{22-24} = \frac{i_{22}}{v_{24}}$$

with the pairs 22 and 23 short-circuited;

$$Y_{24-23} = \frac{i_{24}}{v_{23}}$$

with the pairs 22 and 24 short-circuited; and $$Y_{23-22} = \frac{i_{23}}{v_{22}}$$

with the pairs 23 and 24 short-circuited.
And these admittances also are equal to each other, i.e., $$Y_{22-24} = Y_{24-23} = Y_{23-22} = Y_F$$

Further, the three reverse admittances of a symmetrical circulator element are defined as follows:

$$Y_{22-23} = \frac{i_{22}}{v_{23}}$$

with the pairs 22 and 24 short-circuited;

$$Y_{23-24} = \frac{i_{23}}{v_{24}}$$

with the pairs 22 and 23 short-circuited; and $$Y_{24-22} = \frac{i_{24}}{v_{22}}$$

with the pairs 23 and 24 short-circuited.

And these admittances are respectively equal, i.e., $$Y_{22-23} = Y_{23-24} = Y_{24-22} = Y_R$$

Additionally, each terminal pair of a circulator element of the type herein described may have connected thereacross a load admittance $Y_L$.

Assume, given a circulator element characterized by a forward loss of about 17.5 decibels, that it is desired to provide a circulator assembly having both a lower forward loss and a higher reverse to forward loss ratio than provided by the element alone. The combination shown in Fig. 2 is such an assembly, and the graph shown in Fig. 7 may advantageously be employed in choosing a proper value of the resistors 28 thereof.

Figure 7:
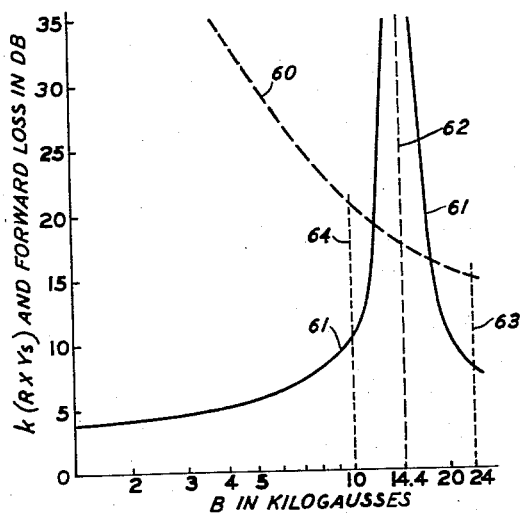
Fig. 7 is a graph for aiding in the determination of specific parameter values for illustrative embodiments of this invention.

The dashed line 60 of Fig. 7 is a representation of the forward loss of a circulator assembly, of the type shown in Fig. 2, as a function of the strength of the perpendicular magnetic field applied to the semiconductive disc 21, and the solid lines 61 of Fig. 7 are a plot of $k$ as a function of the perpendicular magnetic field, where $k = R \times Y_S$.

The dashed vertical line 62 of Fig. 7 indicates the value of the perpendicular magnetic field at which the specific circulator element for which the curves are plotted exhibits proper circulating action; an action characterized by a relatively low forward loss and a relatively high reverse to forward loss ratio. The reverse loss of the assembly shown in Fig. 2 is of the order of 60 decibels and remains relatively constant if, as the perpendicular magnetic field is varied over the range therefor depicted in Fig. 7, the parallel resistors are correspondingly adjusted. Therefore, an effort at improving the reverse to forward loss ratio of the assembly 20 is directed to lowering the forward loss thereof.

If then it is desired that the assembly 20 be characterized by a forward loss of, for example 15 decibels (rather than the 17.5 decibels of the circulator element alone), it is seen, from the intersections of the dotted line 63 with the curve 61 and the $x$ axis, that $k$ and $B$ values of 8 and 24, respectively, are required.

The value of 24 may readily be attained by adjustment of the magnetic field producing means. Also, the expression $k = R \times Y_S$ may readily be solved for R (substituting 8 for $k$, and for $Y_S$ the self admittance of the circulator element measured at $B = 24$), this then being the value of each of the resistors 28 of the assembly 20.

Further, the value of $Y_L$ in the assembly 20 of Fig. 2 should advantageously be chosen such that it is equal to the self admittance of the circulator element of the assembly 20, the self admittance of the element having been measured at the magnetic field value represented by the intercept of the vertical line 62 with the $x$ axis.

Turning now to Fig. 3, there is shown another specific embodiment of the principles of the present invention. The assembly 30 there shown illustratively includes a hexagonal slice 31 of semiconductive material to each of the six side edges of which there is connected an electrical terminal, the terminals being arranged in three pairs, 32, 33 and 34. The assembly 30 further includes a resistance network consisting of the equivalued resistors 38, and means for applying a magnetic field perpendicular to the main faces of the the member 31.

The principal attribute of the assembly 30 is that signal circulating action may be attained therein with considerably smaller magnetic fields, and thus smaller and less expensive magnetic structures, than those required in a circulator element per se. It is to be noted, however, that the assembly 30 is, compared to a circulator element, characterized by a higher forward loss.

Assume, for example, that a forward loss of about 21 decibels may be tolerated in a transmission system including the assembly 30. Signal circulating action may then be realized with a B value of only 10 (refer to the dotted vertical line 64 in Fig. 7). The intersection of the line 64 with the curve 61 gives a $k$ value, about 10, from which the value of each of the resistors 38 may be calculated, and again the values of the load resistors should advantageously be made equal to the self admittance of the circulator element of the assembly 30, the self admittance thereof having been measured in a magnetic field of a value specified by the line 62.

In fact, the resistor elements of an assembly made in accordance with the principles of the present invention may be selected such that the assembly will perform a signal circulating function even in those cases where the load resistors connected to the assemblies are asymmetrical in value. More specifically, such an assembly may include a symmetrical circulator element and asymmetrical load resistors in combination with a parallel network having resistors therein which are respectively different in value. And, if both the circulator element and the load resistors are asymmetrical in a given fashion, proper circulating action may still be attained by means of an assembly comprising a parallel network including equivalued resistors.

Also, it is feasible, in accordance with the principles of this invention, to make asymmetrical circulator elements which are connected to symmetrical load resistors appear symmetrical by adding thereto parallel resistance networks including resistors have respectively different values. Conversely, a symmetrical circulator element connected to symmetrical load resistors can be made to appear asymmetrical in some desired manner by the addition thereto of a parallel resistance network including resistors which are not equivalued.

Figure 5:
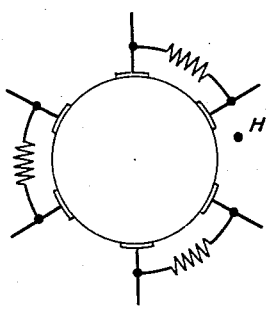
Figure 6:
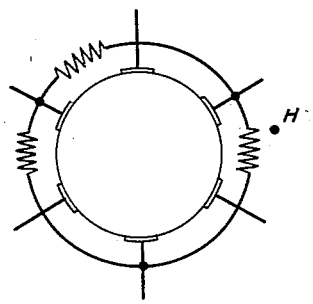

The principles of the present invention may be embodied in circulator assemblies comprising parallel resistor networks which respectively include only three resistor elements. Thus, for example, the assembly of Fig. 2 may be simplified to take the form shown in Fig. 4, or, alternatively, that shown in Fig. 5. Similarly, the assembly of Fig. 3 may be simplified to the form shown in Fig. 6.

The characteristics of a circulator element are typically temperature dependent. This dependence may be greatly reduced in effect by combining resistance networks in parallel therewith, which networks consist of resistance units exhibiting selected temperature coefficients of resistance.

Furthermore, in accordance with the principles of the present invention, the impedance level of a circulator element may be adjusted to a desired value by employing a proper parallel resistance network in combination therewith.

It is to be understood that the above-described arrangements are illustrative and not restrictive of the principles of the present invention. Other arrangements may be devised by those skilled in the art without departing from the spirit and scope of this invention. For example, negative resistance elements may be included in the parallel networks herein described, in this manner eliminating the forward losses of the assemblies (or even obtaining negative losses, or gains) without decreasing the relatively high reverse loss characteristics thereof. (If the values of these negative resistance elements are changed in a desired manner the direction of circulation may thereby be changed.)

What is claimed is:

1. In combination, a Hall-effect element having a pair of major faces and a plurality of at least six connections distributed substantially equally spaced around the perimeter of the element, each opposed pair of connections of the plurality forming a pair of terminals of a circulator, means for establishing a magnetic field in the element passing through the major faces, and a resistive network including a plurality of at least three resistive means of which separate resistive means are connected between different pairs of unopposed connections, the strength of the magnetic field in the element and the resistances of said resistive means providing circulating action between said pairs of terminals.

2. The combination of claim 1 characterized in that the resistive means insert equal resistance between the connections connected thereby.

3. The combination of claim 1 characterized in that each resistive means is connected between a different pair of adjacent connections.

4. The combination of claim 1 characterized in that each resistive means is connected between a different pair of alternate connections.

5. The combination of claim 1 characterized in that separate resistive means are connected between different pairs of adjacent connections and between different pairs of alternate connections.

6. In combination, a Hall-effect element having a pair of opposed major faces and six connections spaced substantially equally around the perimeter of the element, the three pairs of opposed connections forming three pairs of terminals of a circulator, means for establishing a magnetic field in the element passing through the opposed major faces, and a resistive network including six resistive means, separate resistive means being connected between different pairs of adjacent connections, the resistances of the resistive means and the strength of the magnetic field providing circulating action between the three pairs of terminals.

7. The combination of claim 6 further characterized in that the resistive network includes three additional resistive means, each of which is connected between a different pair of alternate connections.

8. In combination, a Hall-effect element having a pair of opposed major faces and six connections spaced substantially equally around the perimeter of the element, the three pairs of opposed connections forming three pairs of terminals of a circulator, means for establishing a magnetic field in the element passing through the opposed major faces, and a resistive network including three resistive means, separate resistive means being connected between different ones of the three pairs of connections formed by four successive connections, the resistances of the resistive means and the strength of the magnetic field providing circulating action between the three pairs of terminals.

9. In combination, a Hall-effect element having a pair of opposed major faces and six connections spaced substantially equally around the perimeter of the element, the three pairs of opposed connections forming three pairs of terminals of a circulator, means for establishing a magnetic field in the element passing through the opposed major faces, and a resistive network including three resistive means, separate resistive means being connected between different pairs of adjacent connections such that each connection has connected thereto only one of the resistive means, the resistances of the resistive means and the strength of the magnetic field providing circulating action between the three pairs of terminals formed by the three pairs of opposed connections.

10. In combination, a Hall-effect element having a pair of opposed major faces and six connections spaced substantially equally around the perimeter of the element, the three pairs of opposed connections forming the three pairs of terminals of a circulator, means for establishing a magnetic field in the element passing through the opposed major faces, and a resistive network including three resistive means, separate resistive means being connected between alternate connections such that each of three alternate connections has connected thereto two different resistive means, the resistances of the resistive means and the strength of the magnetic field providing circulating action between the three pairs of terminals.

No references cited.